United States Patent [19]

Kagami

[11] 4,019,075
[45] Apr. 19, 1977

[54] IRONLESS ROTOR WINDINGS OF ROTARY COILS IN MINIATURE ELECTRIC MACHINES

[75] Inventor: Isao Kagami, Kawasaki, Japan

[73] Assignees: Canon Kabushiki Kaisha; Canon Seiki Kabushiki Kaisha, both of Tokyo, Japan

[22] Filed: Feb. 10, 1975

[21] Appl. No.: 548,760

Related U.S. Application Data

[63] Continuation of Ser. No. 379,832, July 16, 1973, abandoned, which is a continuation of Ser. No. 182,696, Sept. 22, 1971.

[30] Foreign Application Priority Data

Sept. 26, 1970 Japan .............................. 45-84455

[52] U.S. Cl. .......................... 310/206; 310/40 MM; 310/266
[51] Int. Cl.² ........................................ H02K 23/30
[58] Field of Search ............. 310/40 MN, 167, 266, 310/179, 180, 171, 154, 198, 202, 203, 43, 206, 195, 208

[56] References Cited

UNITED STATES PATENTS

| 2,849,630 | 8/1958 | Waloff | 310/40 MM |
| 2,952,788 | 9/1960 | Volkering | 310/40 MM |
| 3,191,081 | 6/1965 | Faulhaber | 310/40 MM |
| 3,237,036 | 2/1966 | Konig | 310/266 |
| 3,308,319 | 3/1967 | Faulhaber | 310/266 |
| 3,360,668 | 12/1957 | Faulhaber | 310/195 |
| 3,488,837 | 1/1970 | Massouda | 310/266 |

*Primary Examiner*—R. Skudy
*Attorney, Agent, or Firm*—Fitzpatrick, Cella, Harper & Scinto

[57] ABSTRACT

An ironless rotor of high accuracy is provided readily and simply by coiling an elongated conductor into a plurality of hexagonal windings with a predetermined thickness, wrapping the windings around a cylindrical core member in such a manner that any overlap of the windings does not exceed two layers, and shaping the windings into an integral cylindrical form. Such ironless rotor is applicable to miniature electric motors to enhance the efficiency of the latter.

5 Claims, 8 Drawing Figures

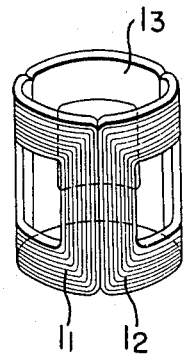
PRIOR ART FIG. 1
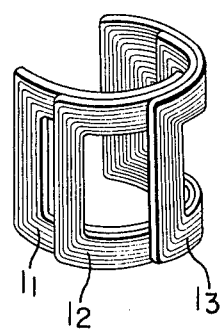
PRIOR ART FIG. 2
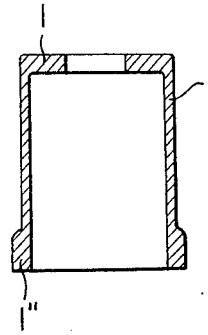
PRIOR ART FIG. 3
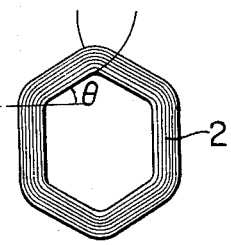
FIG. 4
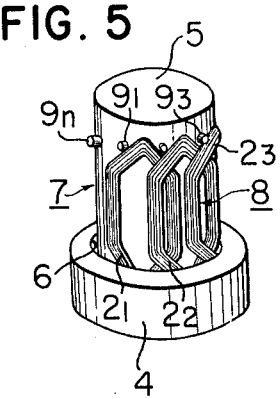
FIG. 5
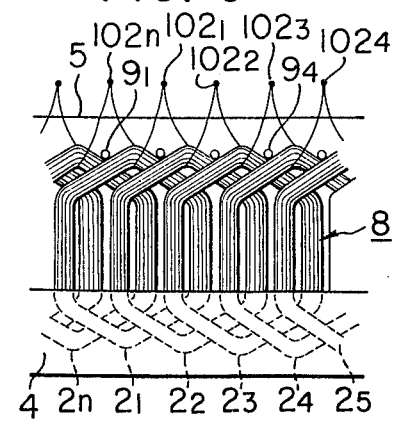
FIG. 6
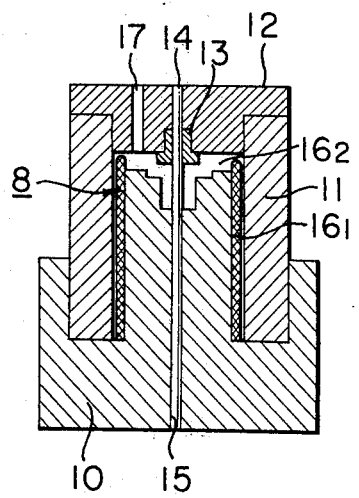
FIG. 7
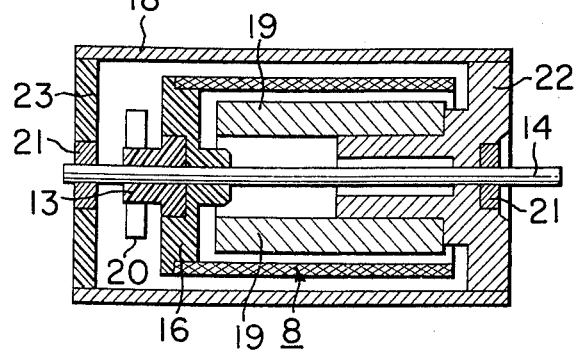
FIG. 8

IRONLESS ROTOR WINDINGS OF ROTARY COILS IN MINIATURE ELECTRIC MACHINES

This is a continuation of application Ser. No. 379,832 now abandoned, filed July 16, 1973, which, in turn, is a continuation of application Ser. No. 182,696, filed Sept. 22, 1971.

BACKGROUND OF THE INVENTION

1. Field of the Invention

This invention relates to ironless rotor windings of drag cup type rotary coils used in miniature electric machines and to a method of making such ironless rotor windings.

2. Description of the Prior Art

In the rotary electric machines, and especially in the so-called micromotors, any slightest improvement in efficiency means great advantages in their uses or applications. In other words, any decrease in power loss may directly lead to the elimination of unstable factors, causes of heating, fluctuations and so forth.

The losses in motors include iron loss, copper loss and mechanical loss. If a rotor has no iron core, no hysteresis loss will occur due to the alternation of magnetic fluxes and the possible eddy current at the stator will be negligible, if any. Thus, it will be unnecessary to take the iron loss into consideration as a whole. Furthermore, the reactance voltage which may be produced in the coils during commutation will be extremely reduced due to the absence of the core, thereby ensuring an almost ideal commutation to take place and accordingly resulting in a stable operation and longer service of the commutators.

In the motors of the described type and having no iron loss, the following motor circuit formula is well satisfied:

$$I_a V - I_a^2 R = I_a E_c \quad (1)$$

where $R = R_a + R_b$ and $I_a$ represents armature current, $V$; voltage of electric source, $R_a$; armature resistance, $R_b$; brush contact resistance, and $E_c$; output voltage. Therefore, by designing the motors so that the copper loss $I_a^2 R$ may be minimized relative to the input $I_a V$, the output $I_a E_c$ may be maximized. Thus, simply by minimizing the mechanical loss contained in the output $I_a E_c$, the motors may readily be increased in efficiency.

To reduce the copper loss, the armature coils must be formed of thicker conductors to decrease the electric resistance R. Such ironless rotor windings have heretofore been formed by two alternative methods. One of them is the method known as bobbinless winding or the method which employs no spool. According to this method, the rigidity of the conductor to be wound is utilized to wind it into successive close turns which are oblique as much as possible with respect to the axis of the winding, and usually one reciprocal winding cycle provides one layer of the conductor. In such a coil, its thickness in the air gap is twice the diameter of the wound conductor. The bobbinless winding method method often encounters difficulties in forming multilayer coils because of its bobbinless nature, and this also limits the number of effective conductors.

The other known method employs a spool and permits the thickness of the coil in the air gap to be selected as desired in accordance with the size of the air gap. A wider air gap may be provided by forming a multilayer coil. In other words, the width of the air gap may be determined in accordance with the number of turns and thus, the number of effective conductors is not limited.

In the rotary electric machines of the drag cup type, the number of revolutions depends on the number of effective conductors in the coil. In order to provide a low-speed motor for a high torque, the number of effective conductors must be increased, In the first-named bobbinless winding method, however, the number of effective conductors is limited as described already, and an effort to increase such number would encounter the need to reduce the diameter of the conductors. As a result, the electric resistance R of the armature would be increased to thereby increase the copper loss and reduce the efficiency of the rotor as a whole.

Contrarily, the second-named spool-type winding method permits a conductor of greater diameter to be wound into multiple layers, which means adaptability of increasing number of effective conductors and maintaining a lower electric resistance, and thus results in a motor of higher efficiency.

Furthermore, motors manufactured by the first-named winding method may only be applicable for relatively high-speed rotation because of the limited number of conductors in their armatures, whereas motors manufactured by the second-named winding method permit the total number of conductors to be increased and therefor, irrespective of any increase in the size of the field air gap, the flux density in the air gap will be prevented from reduction by using less expensive magnets such as barium ferrite magnets instead of more expensive metallic magnets and utilizing the entire flux maintained by such magnets. Thus, the latter method leads to economical advantages of the motors resulting therefrom.

SUMMARY OF THE INVENTION

It is an object of the present invention to provide a miniature electric machine having an armature formed by a novel method improved over the winding method of the second-type.

It is another object of the present invention to provide a miniature electric machine which has eliminated the above-described disadvantages peculiar to the conventional rotor windings and in which a number of windings may be provided without so much enlarging the air gap in the magnetic circuit, to thereby readily and accurately provide an ironless rotor of high efficiency.

It is still another object of the present invention to provide a miniature electric machine in which windings are uniformly arranged without any overlapped portion thereof exceeding two layers irrespective of any increase in the number of conductors forming the rotor windings, to thereby provide a rotor of high accuracy without requiring any large size of air gap and without its balance as rotor being marred.

These and other objects of the present invention will become fully apparent from the following detailed description of an embodiment thereof taken in conjunction with the accompanying drawings.

BRIEF DESCRIPTION OF THE DRAWINGS

FIGS. 1 to 3 show the constructions of the various ironless rotors according to the prior art.

FIG. 4 is a plan view of a hexagonal winding used with the present invention.

FIGS. 5 to 7 illustrate the steps through which the ironless rotor of the present invention is formed, FIG. 5 being a perspective view of a cylindrical coil as it is being so formed from the hexagonal windings shown in FIG. 4, FIG. 6 being a developed view for showing the arrangement of a plurality of windings forming the cylindrical coil, and FIG. 7 being a sectional view of a mold structure for forming the cylindrical coil into a complete rotor.

FIG. 8 is a cross-sectional view of a miniature electric machine to which the rotor of the present invention has been applied.

DESCRIPTION OF THE PREFERRED EMBODIMENTS

The conventional ironless rotary coils provided by the spool-type winding method mentioned above are formed of square windings. For example, as shown in FIG. 1, when three square windings $1_1-1_3$ are curved and assembled together into a cylindrical form, the air gap in the magnetic circuit is larger in size for the small number of windings in use. When a greater number of windings are used to provide the form as shown in FIG. 2, adjacent windings are overlapped at their upper and lower end portions to further increase the air gap in the magnetic circuit. To avoid this, a construction as shown in the sectional view of FIG. 3 is sometimes employed, in which the upper part 1' of the winding 1 (i.e. that side of the winding on which a commutator is to be mounted) is turned inwardly and the lower part 1'' alone is outwardly enlarged to minimize the air gap in the effective conductor portion. However, such windings are difficult to form and assemble together and the construction of the entire rotor is complex. In addition, depending on the mode of overlap between the adjacent windings, the resulting rotor may be subject to an unbalance which must be corrected later.

Referring to FIG. 4, there is shown a hexagonal winding 2 for use with the present invention. The hexagonal winding 2 may be formed by winding a conductor of heat-fusibility into a required number of turns and into a predetermined thickness, and then shaping the winding into a hexagonal form. In the winding 2, the angle of bend ($\theta$) of that side thereof which is adjacent to the connection end portion should preferably be 30°. An angle $\theta$ larger than 30° would cause an undesirable gap between adjacent windings at the connecting end portions thereof, and an angle $\theta$ smaller than 30° would cause undesirable overlaps between adjacent windings.

Subsequently, as shown in FIG. 5, a cylindrical pillar 5 in disposed vertically in a bed 4 in concentric relationship therewith. A core member 7 having grooves 6 formed in the outer surface of the base portion thereof is dispsed so as to surround the cylindrical pillar 5. A plurality of windings are then disposed around the cylindrical pillar 5 by fitting partially in the groove 6 in such a manner that they are uniformly aligned therearound. The assembly thus provided is subsequently subjected to heat and pressure so that a series of windings $2_1-2_n$ are connected together to thereby form an integral coil body 8, which is removed from the cylindrical pillar 5.

To facilitate a positioning of the windings $2_1-2_n$ in the above-described process, the cylindrical pillar 5 may preferably have a plurality of projections $9_1-9_n$ planted along a periphery thereof and equally spaced apart circumferentially thereof, so that the windings $2_1-2_n$ may be disposed around the cylindrical pillar 5 with using these projections as the guides therefor.

FIG. 6 shows the arrangement of the windings $2_1-2_n$ in a developed plan view. As shown, any overlapped portion of the windings $2_1-2_n$ is in no more than two layers. Therefore, if the diameter or thickness of a conductor forming the individual windings $2_1-2_n$ is 0.4 mm., the thickness of the entire coil may be minimized to 0.8 mm. at the extremity by applying a sufficient pressure thereto during the integrating process.

Referring now to FIG. 7, there is shown a mold consisting of a lower die 10, an intermediate die 11 and an upper die 12. The upper die 12 is initially absent from the mold. A shaft 14 having a commutator 13 fixed at a predetermined position thereof is inserted into a central bore 15 formed through the lower die 10, and then the coil body 8 is inserted into a clearance 16 defined between the lower die 10 and the intermediate die 11. On this occasion, the lower die 10, its central bore 15 and the clearance 16 must all be concentric with such accuracy that the coil body 8 can readily be inserted into the clearance 16 without being eccentric and inclined relative to the dies 10 and 11. There upon, the riser portion of the commutator 13 fixed to the shaft 14 and the connecting portions $102_1-102_n$ at the leading and trailing ends of the respective windings $2_1-2_n$ are connected together by means of solder or like means. Since the connecting portions of the windings are at the leading and trailing edges thereof, as shown in FIGS. 6 and 8, the opposing vertical sides of the windings (as viewed in FIGS. 6 and 7) will be parallel to the shaft 14 when assembly is completed, and that these sides are in overlapping but offset relation to simmilar sides of other hexagonal windings in the coil (FIGS. 5 and 6). Thereafter, the upper die 12 is fitted in place as shown in FIG. 7, whereafter suitable synthetic resin material is introduced into a space $16_2$ in the mold through an inlet hole 17 formed through the upper die 12. Thus, the shaft 14, the commutator 13 and the coil body 8 are made integral to one another, whereafter the integral assembly is removed in the form of a rotor from the mold. The synthetic resin material filled in the clearance 16, and the space $16_2$ defined between the lower and upper dies 10 and 12 later provdes a fixing member 16 (FIG. 8) for interconnecting the coil body 8 and the shaft 14.

FIG. 8 shows a motor incorporating the rotor thus provided through the above-described process. The motor includes a stationary annular iron yoke 18 and a stationary annular field pole 19, the latter comprising a metallic permanent magnet or a barium ferrite magnet or the like. There are further seen a brush 20, bearings 21 for rotatably journalling the rotor shaft 14, a flange member 22 for supporting the field pole 19, bearing 21 and iron yoke 18, and an end cover plate 23 for supporting the bearing 21 and iron yoke 18.

According to the present invention, as will be appreciated from the foregoing description, the overlaps of the windings at their connecting end portions never exceed two layers even if the number of windings is increased to provide a greater number of effective conductors in the armature. Moreover, all the windings can be arranged uniformly without requiring any greater size of air gap. Furthermore, a rotor of high accuracy can be manufactured readily and simply without marring its balance as rotor, thus enabling the production of miniature electric machines of high efficiency.

I claim:

1. In a miniature electric machine having an ironless rotor, the rotor comprising:
   a. a rotary shaft;
   b. a commutator fixed on said rotary shaft; and
   c. a coil body,
   said rotary shaft, commutator, and coil body being molded with a synthetic resin into an integral body,
   said coil body being composed of a plurality of windings of individual conductors, each said winding being formed in a hexagonal shape,
   the center axis of each of said plurality of individual hexagonal windings being disposed in parallel with the axis of said rotary shaft so that a pair of opposing sides of said each individual hexagonal winding is parallel with said rotary shaft, one of said opposing sides of each winding being disposed in overlapping but offset relation to at least one of said opposing sides of another of said windings and each winding being of a radial thickness no greater than the thickness of the conductor so that the thickness of said coil body is about twice the thickness of said individual winding, and the remaining four sides thereof being curved in conformity to the curvature of the cylindrical surface around the periphery of said rotary shaft.

2. A machine according to claim 1, wherein said coil body has a first opening at one end thereof and a second opening at the other end thereof, the leading and trailing ends of each winding being collected at said first opening and being electrically connected to said commutator, and fixing means are provided to integrate said shaft, coil body and commutator and maintain said shaft at a position corresponding to the center axis of said coil body and said commutator at said first opening of said coil body whereby said first opening is closed and said second opening is open.

3. A miniature electric machine having an ironless rotor, comprising:
   a. a motor casing having:
      1. a stationary annular iron yoke member (18);
      2. a flange member (22) to close an opening at one end of said iron yoke member; and
      3. an end cover member (23) to close an opening at the other end of said iron yoke member;
   b. a rotary shaft (14);
   c. a rotor which rotates integrally with said rotary shaft within said motor casing, and having:
      1. a coil body constructed with a plurality of windings, each formed of a single conductive wire wound for a given number of turns in a planar hexagonal shape, and being curved with a predetermined curvature, two sides of said each curved hexagonal winding being substantially parallel with a center axis passing through the center of the curvature, each of said plurality of windings being regularly arranged in one direction and in offsetting relation to each other, each winding being disposed relative to at least one sequentially adjacent winding in such manner that one of said two sides of each winding substantially parallel with said center axis is overlapped by one side of at least one adjacent winding in a stepform, said overlapping of said adjacent windings not exceeding two layers at any overlapped portion thereof, thereby forming the overlappingly arranged windings into an annular ring shape, and fixing the mutually adjacent windings as an integral coil body, said coil body having a first opening which is open at one end thereof opposite to said end cover member and a second opening which is open at the other end thereof opposite to said flange member, the leading and trailing ends of said each winding being collected at said first opening, and the center axis being coincident with the center axis of said rotary shaft;
      2. a commutator (13) fixedly provided on said rotary shaft, the leading and trailing ends of said each winding being electrically connected to said commutator;
      3. a fixing member (16) for integrating said rotary shaft, said coil body and said commutator, said fixing member causing said commutator (13) to be disposed on said rotary shaft in such a manner that it is positioned at said first opening of said coil body, and thereafter covering the peripheral surface of said coil body so as to form said rotor in a drug-cup shape, wherein only the second opening of said coil body is open and the first opening is closed, and a synthetic resin material injected and solidified in a gap between said commutator and said first opening so as to render the surface thereof uniform;
   d. a cylindrical permanent magnet (19) disposed inside said coil body through said second opening of said coil body, one end of which is fixed to said flange member, and the other end of which is free; and
   e. brush means (20) electrically connected to said commutator to supply external electric current to said coil body.

4. A machine according to claim 3, wherein said overlappingly arranged windings are formed into an annular ring in such manner that a pair of angled parts between said two sides parallel with said center axis are positioned at respective ends of said ring, a cylindrical permanent magnet is disposed inside said coil body through said second opening therein, one end of which is fixed to said flange member, and brush means are electrically connected to said commutator to supply external current to said coil body.

5. An ironless rotor for a miniature rotary electric machine, comprising:
   a. a rotor shaft;
   b. a coil body constructed with a plurality of windings, each being formed of a single conductor wire wound for a given number of turns in a planar hexagonal shape, and being curved with a predetermined curvature the center axis of each of said plurality of individual hexagonal windings being disposed in parallel with the axis of said rotary shaft so that a pair of opposing sides of said each individual hexagonal winding is parallel with said rotary shaft, one of said opposing sides of each winding being disposed in overlapping but offset relation to at least one of said opposing sides of another of said windings and each winding being of a radial thickness no greater than the thickness of the conductor so that the thickness of said coil body is about twice the thickness of said individual winding, and the remaining four sides thereof being curved in conformity to the curvature of the cylindrical surface around the periphery of said rotary shaft thereby forming the overlappingly arranged windings into an annular ring shape, said coil body having a first opening at one end thereof and a second opening at another end thereof, the leading and trailing ends of said each winding being collected at said first opening, and the center axis being coincident with the center axis of said rotary shaft;

c. a commutator fixedly provided on said rotary shaft, the leading and trailing ends of said each winding being electrically connected to said commutator; and d. a fixing member for integrating said rotary shaft, said coil body and said commutator, said fixing member causing said rotary shaft to be disposed at a position corresponding to the center axis of said coil body, and causing said commutator to be disposed on said rotary shaft in such a manner that it is positioned at said first opening of said coil body, and covering the peripheral surface of said coil body to form said rotor in a drug-cup shape, wherein said second opening alone is open and said first opening is closed, and a synthetic resin being injected into a gap between said commutator and said first opening so as to render the surface thereof uniform.

* * * * *